United States Patent [19]

Chiba

[11] Patent Number: 5,974,512

[45] Date of Patent: Oct. 26, 1999

[54] SYSTEM FOR SAVING AND RESTORING CONTENTS OF A PLURALITY OF REGISTERS

[75] Inventor: Masakazu Chiba, Tokyo, Japan

[73] Assignee: NEC Corporation, Tokyo, Japan

[21] Appl. No.: 08/796,057

[22] Filed: Feb. 7, 1997

[30] Foreign Application Priority Data

Feb. 7, 1996 [JP] Japan ................................. 8-020338

[51] Int. Cl.[6] ....................................................... C06F 12/00
[52] U.S. Cl. .......................... 711/162; 711/160; 711/161; 395/180; 395/182.03
[58] Field of Search ................................... 711/161, 162, 711/160, 165, 144, 145, 156, 163; 395/182.03, 182.04, 185.05, 182.06

[56] References Cited

U.S. PATENT DOCUMENTS

| | | | |
|---|---|---|---|
| 4,099,234 | 7/1978 | Woods et al. | 395/182.09 |
| 5,680,570 | 10/1997 | Rantala et al. | 711/113 |
| 5,680,640 | 10/1997 | Ofek et al. | 395/839 |
| 5,682,517 | 10/1997 | D'Andrea et al. | 711/162 |
| 5,689,732 | 11/1997 | Kondo | 395/884 |

FOREIGN PATENT DOCUMENTS

4-211837  8/1992  Japan .

*Primary Examiner*—John W. Cabeca
*Assistant Examiner*—Mehdi Namazi
*Attorney, Agent, or Firm*—Scully, Scott Murphy & Presser

[57] ABSTRACT

A system for saving contents of a plurality of registers into a memory. The system has a bit sequence, wherein the value of each individual bit of the bit sequence is set to indicate a modification status of a corresponding register; and control means for saving contents of each of the registers indicated to have been modified at a predetermined address of the memory and for revising the predetermined address. In a preferred implementation, the system saves contents of a plurality of registers into a first area of a memory and for restores contents of the plurality of registers with contents previously saved in a second area of the memory. The system has the first bit sequence as above and control means for saving contents of the first bit sequence, for saving contents of each of the registers indicated to have been modified at a predetermined address of the first area of the memory and for revising the predetermined address, for restoring contents previously saved at a restoring address of the second area of the memory into each of the registers to be restored, for revising the restoring address, and for referring to a second bit sequence saved in the second area of the memory, wherein each bit of the second bit sequence is set to indicate a modification status of corresponding registers at the time when the contents to be restored are saved and each of the registers to be restored are indicated to have been modified.

4 Claims, 7 Drawing Sheets

| REGISTER R0 |
| --- |
| REGISTER R1 |
| REGISTER R2 |
| REGISTER R4 |
| REGISTER R5 |
| REGISTER R6 |
| REGISTER R7 |
| . . . . |
| REGISTER R22 |
| REGISTER R23 |
| REGISTER R24 |
| REGISTER R25 |
| REGISTER R26 |
| REGISTER R27 |
| REGISTER R28 |
| REGISTER R29 |
| REGISTER R30 |
| REGISTER R31 |

(bits 0 to 31)

FIG.7

SYSTEM FOR SAVING AND RESTORING CONTENTS OF A PLURALITY OF REGISTERS

BACKGROUND OF THE INVENTION

The present invention relates to a saving and restoring system of a register bank, and particularly to that to be applied for controlling saving and restoring process of contents of registers, which is performed for task-switching of a microprocessor operating with a multi-task OS (Operating System).

Today, multi-programing method is well applied for improving operation efficiency of a microprocessor. In the multi-programing method, a program is divided into a plurality of tasks, namely execution units, among which an appropriate task is selected by the OS and assigned to be executed by the CPU. For the execution assignment, context of the executed task in registers used by the CPU at the moment must be saved in an external memory area and context of the assigned task must be restored into the registers read out from another external memory area where it is saved.

Figure 6:
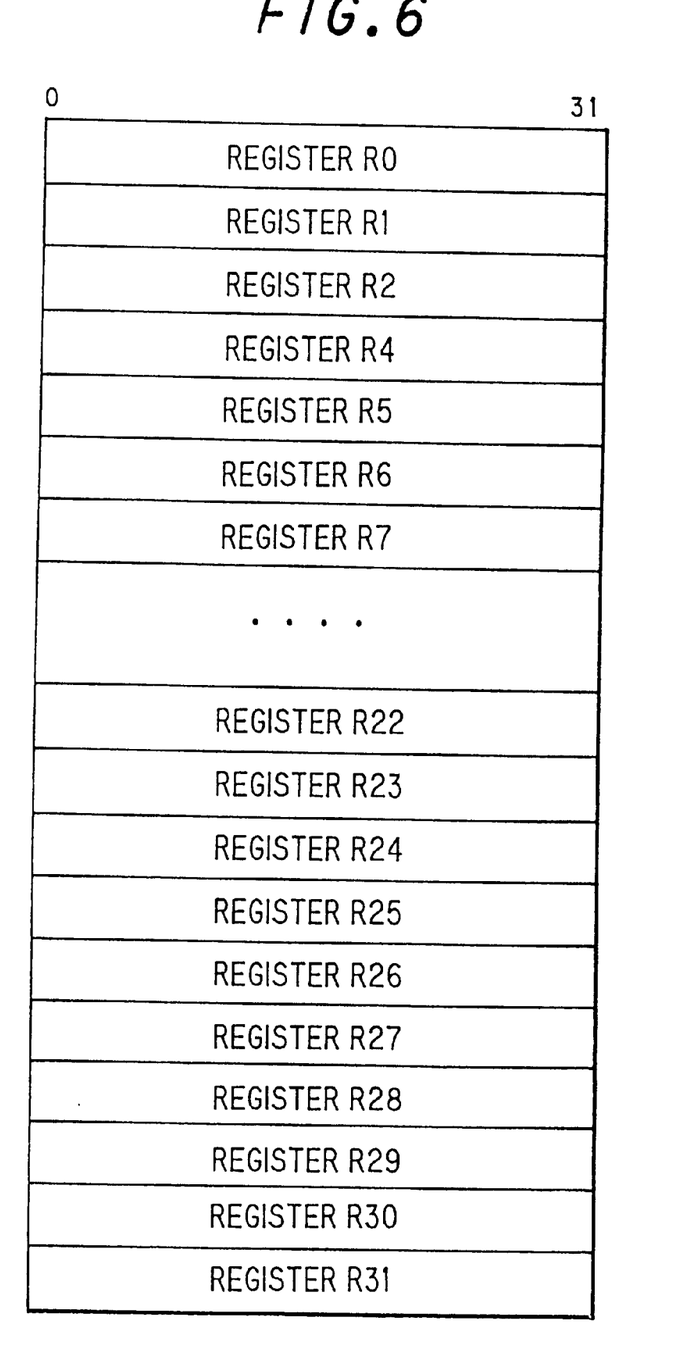
FIG. 6 illustrates an example of registers of a CPU.
Figure 7:
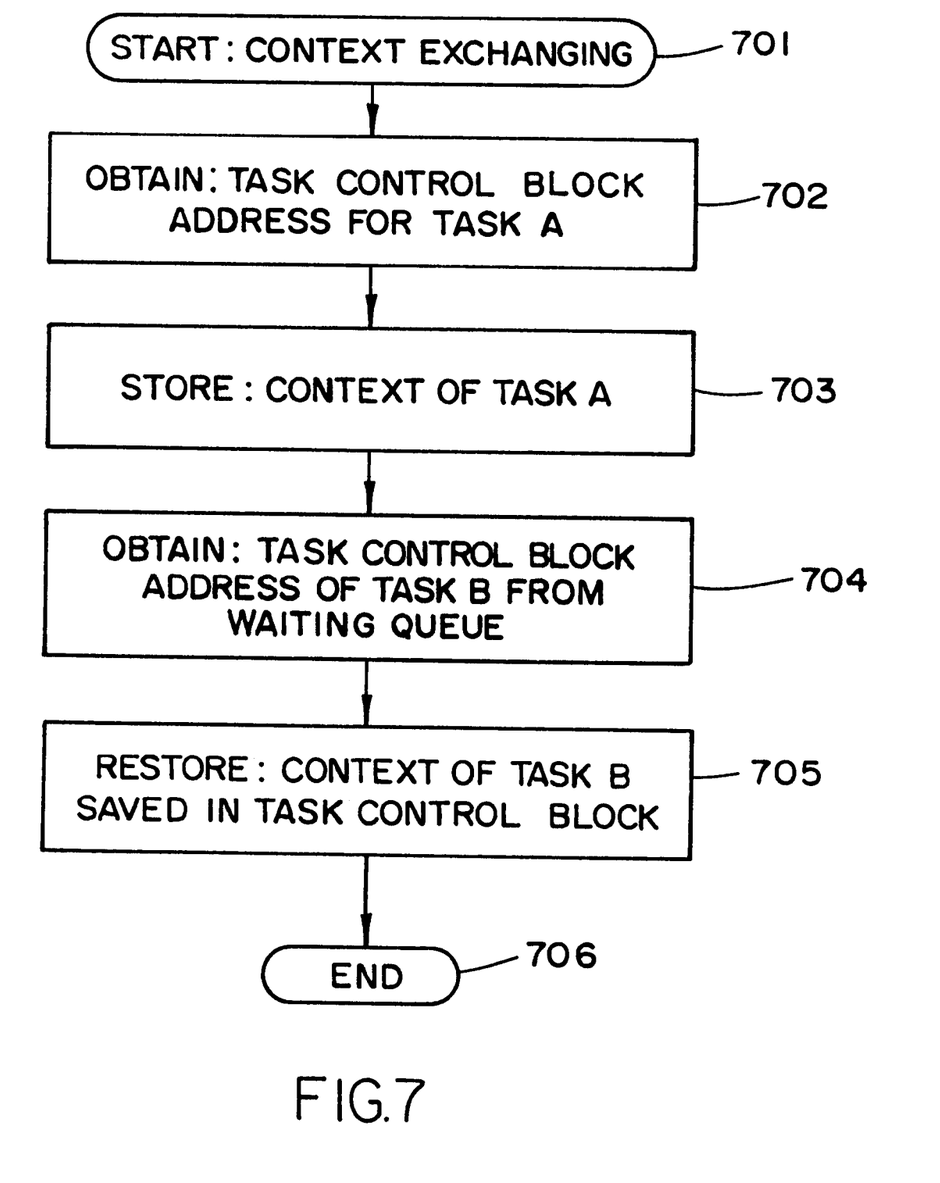
FIG. 7 is a flowchart illustrating a conventional saving and restoring process performed for assigning CPU execution to another task.

Referring to FIGS. 6 and 7, such conventional saving and restoring process will be described.

FIG. 6 illustrates an example of registers of a CPU provided with 32 registers R0 to R31 each having 32 bit-length. The saving and restoring of context in these registers is performed by the CPU according to commands.

FIG. 7 is a flowchart illustrating a saving and restoring process performed for assigning CPU execution to another task.

Suppose, for simplefication, that there are two tasks, task A and task B, to be executed by the CPU, and the CPU execution is to be assigned from task A to task B. Context of each of the tasks A and B is to be restored into the registers R0 to R31 of FIG. 6 and to be saved in each reserved area in a task control block.

Preparing (at step 701) for switching assignment of the task to be executed, OS obtains (at step 702) address of reserved area for the task A in the task control block. Then, the OS executes register bank save command for saving context of the task A at the obtained address of the task control block. According to the register bank saved command, the CPU stores (at step 703) contents of all of the 32 registers R0 to R31 in the area reserved for the task A of the task control block.

Then, the OS obtains (at step 704) task control block address of the task B, which is written at top of a queue of tasks waiting to be assigned listed in a memory area. The OS executes register bank restore command for restoring context of the task B saved in the task control block, according to which the CPU deploys (at step 705) data saved at the task control address in the registers from R0 to R31.

Thus, the OS exchanges context of the task A with that of the task B.

Another prior art will be described next, which is disclosed in a Japanese patent application laid open as a Provisional Publication No. 211837/'92. In the prior art, OS executes register bank saved command in the same way with the flowchart of FIG. 7, according to which the CPU saves data in the registers from the register R0 in order. However in the prior art, the data saving of each register is performed referring to value of modify bits prepared in another memory area, each of the modify bits representing status of data of each corresponding resister, turned to value '1' when data of the corresponding register is modified.

First, the CPU checks value of modify bit corresponding to the register R0. When value of the modify bit is '1', the CPU saves contents of the register R0, because they are modified, at an address reserved for the context, incrementing the address for saving contents of the next register R1.

Then, modify bit for the register R1 being checked and found left at value '0', the CPU performs only the address increment without saving contents of the register R1.

Thus, the CPU continues the process until the register R31, saving contents of concerning register and incrementing the address when corresponding modify bit is at value '1' and only incrementing the address when it is at value '0'.

After that, obtaining task control block address in the same way as at step 704 of FIG. 7, the OS executes register bank restore command for deploying context of the task B into the registers R0 to R31.

According to the register bank restore command, the CPU initializes all the modify bits to value '0' before restoring saved data of the task B into the registers from R0 to R31.

Thus, the OS exchanges context of the task A with that of the task B, in the prior art.

The context transfer inside a microprocessor can be performed at very high speed, but in the multi-task operation, context in the microprocessor should be saved in an external memory area and that of the assigned task should be restored into the resisters from another external memory area at every task switching, by way of an external bus of the microprocessor. As the data transfer through the external bus can not be performed at as high speed as that inside of the microprocessor, operational performance of the microprocessor is inevitably pulled down by the external access through the external bus.

Even in the prior art disclosed in the Provisional Publication No. 211837/'92, wherein at least the same number of address increments and context restorings with the number of the registers are needed, the external accesse results in a large overhead of processing time used by the OS.

SUMMARY OF THE INVENTION

Therefore, a primary object of the present invention is to provide a saving and restoring system of a register bank needing minimum overhead for the saving and restoring process of contents in the registers performed for the task switching.

In order to achieve the object, a saving and restoring system of a register bank of the invention for saving contents of a plurality of registers provided therein into a first area of a memory and restoring contents of the plurality of registers with contents to be restored previously saved in a second area of the memory comprises:

a first bit sequence, value of each bit of the first bit sequence indicating modification status of corresponding each of the plurality of registers;

control means for saving contents of the first bit sequence and contents of each of registers indicated to have been modified referring to value of corresponding each bit of the first bit sequence at a saving address of the first area of the memory and revising the saving address; and control means for restoring contents to be restored previously saved at a restoring address of the second area of the memory into each of registers to be restored and revising the restoring address, referring to a second bit sequence saved in the second area of the memory, value of each bit of the second bit sequence indicating modification status of corresponding each of the plurality of resisters at a moment when the contents to be restored are saved, and said each of registers to be restored corresponding to each bit indicating to have been modified of the second bit sequence.

Therefore, only contents of modified registers are saved and restored for omitting extra external memory accesses through the external bus by way of the present invention, minimizing overhead of processing time used by the OS and consequently, minimizing performance loss inevitable because of context modification.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts, and:

DETAILED DESCRIPTION OF THE PREFERRED EMBODIMENTS

Now, embodiments of the present invention will be described in connection with the drawings.

In the embodiments, contents not modified in a register need not be saved or restored, and so, the saving and restoring, and address revision incidental thereto are sufficient to be performed only for registers having modified contents, resulting in a minimum overhead of the OS.

Figure 1:
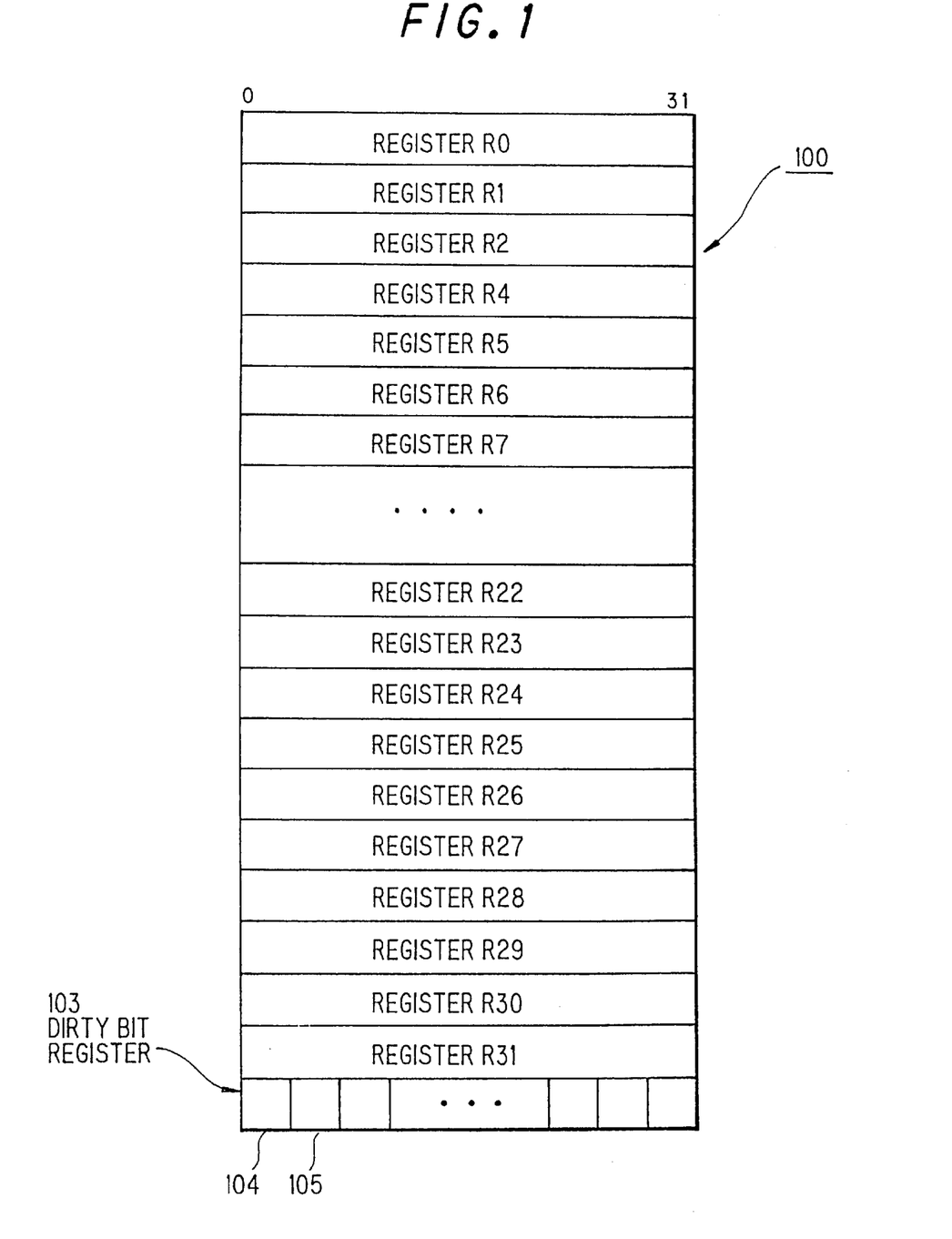
FIG. 1 illustrates a register system 100 applied in an embodiment of the invention.

FIG. 1 illustrates a register system 100 applied in an embodiment of the invention, having a similar configuration with the registers of FIG. 6.

The register system 100 comprises 32 registers R0 to R31, each having 32 bit-length, and further, a dirty bit register 103 wherein 32 dirty bits are ranged, each of the 32 dirty bits indicating modification of corresponding each of the 32 registers R0 to R31, such as a first and a second dirty bit 104 and 105 correspond to the first and the second register R0 and R1, respectively.

When the contents of the first register R0 are modified in executing task A, for example, the first dirty bit 104 is set to value '1', and otherwise it is left at logic '0'. In the same way, value of all the 32 dirty bits is determined along with the execution of the task A.

For a task switching from the task A to a task B, for example, context in the register system 100 is to be exchanged also in the embodiment.

Figure 2:
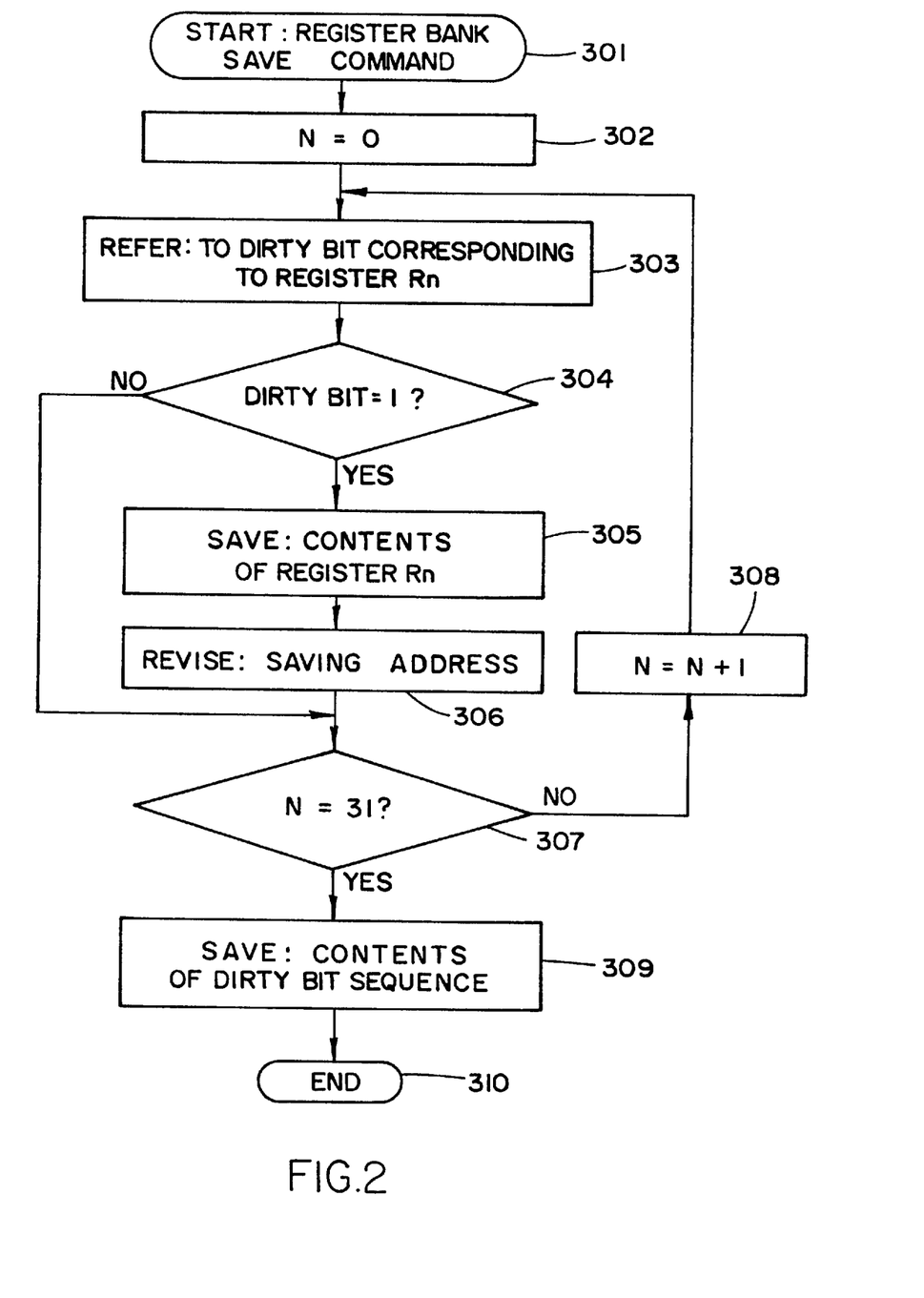
FIG. 2 is a flowchart illustrating algorithm according to which register bank save command is executed in the embodiment.

FIG. 2 is a flowchart illustrating algorithm according to which register bank save command is executed (from step 301) by OS of the embodiment. CPU proceeds to the saving process in order from the first register R0 referring to corresponding dirty bit. When saving contents of the first register R0, the first dirty bit 104 is referred to (at steps 302 and 303).

Supposing a case the first and the second dirty bits 104 and 105 are indicating value '1' and '0', respectively, the CPU saves contents of the first register R0 at a storing address of a context saving area (at step 305) and revises the storing address (at step 306) for a next modified register.

Then, the second dirty bit 105 corresponding to the second register R1 is checked and found left at value '0'. Therefore, the CPU does not save contents of the second register R1 and leaves the storing address not revised, the saving process proceeds from step 304 to step 307.

Thus, steps from 303 to 308 are repeated until saving process for the 32-th register R31, and finally, contents of the dirty bit register 103 is saved (at step 309) at the last revised storing address of the context saving area and the storing address is revised (at step 310) finally.

Then, the OS obtains task control block address of task B in the same way with the conventional system described in connection with the flowchart of FIG. 7.

Figure 3:
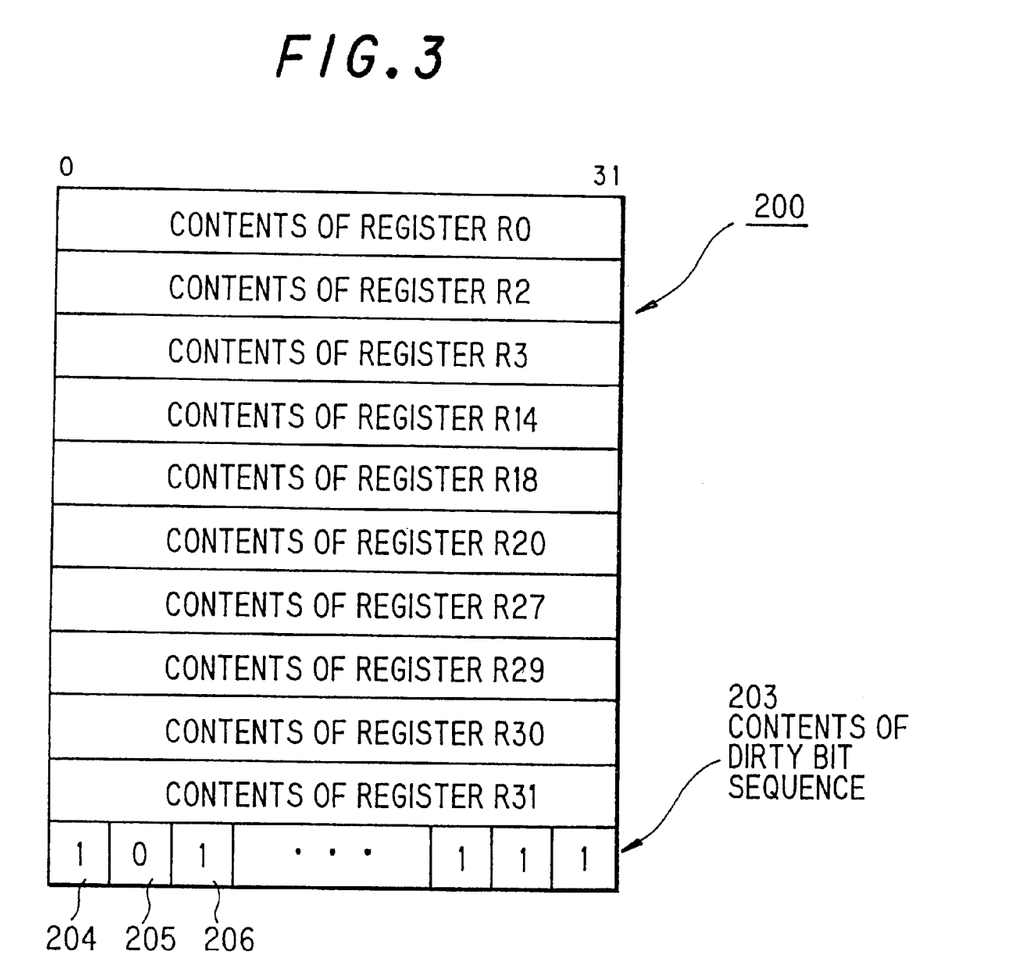
FIG. 3 illustrates an example of context 200 saved at a task control block address to be restored into the register system 100 of FIG. 1.

FIG. 3 illustrates an example of context 200 saved at the task control block address obtained for task B, which is to be restored in the register system 100 of the CPU according to register bank restoring command. In the saved context 200, contents 203 of the dirty bit register 103 are included saved from the register system 100 used for task B. This means that value of each of the dirty bits in the contents 203 indicates each of the 32 registers R0 to R31 where contents of the context 200 are to be deployed.

In other words, the context 200 has only contents of registers which are modified in the previous execution of the task B and consequently saved in the task control address, each of the registers corresponding to each bit having value '1' of the dirty bits in the contents 203.

In the example of FIG. 3, contents of the first and the third registers R0 and R2 are saved and corresponding dirty bits 204 and 206 are at value '1', respectively.

In the following paragraphs, a restoring process performed according to the register bank restoring command for exchanging contexts of tasks to be executed is described referring to restoring algorithm illustrated in a flowchart of FIG. 4.

The CPU starts (at step 401) the restoring process according to the register bank restoring command and restores the contents 203 of FIG. 3 of 32 dirty bits into the dirty bit register 103 in the CPU, for the first (at step 402).

Then, the CPU proceeds to restore contents of the context 200 into the register system 100, 32 bits by 32 bits in order. In the restoration, dirty bits previously restored in the dirty bit register 103 are referred to sequentially (at steps 403 and 404), and deployment of the contents and revision of restoring address are performed (at steps 406 and 407) only for the registers of which corresponding dirty bits are found (at step 406) at value '1'.

After checking (at steps 408 and 409) all the dirty bits, they are all set to value '0'.

Thus, the OS accomplishes (at step 411) the restoring process in the embodiment.

Figure 4:
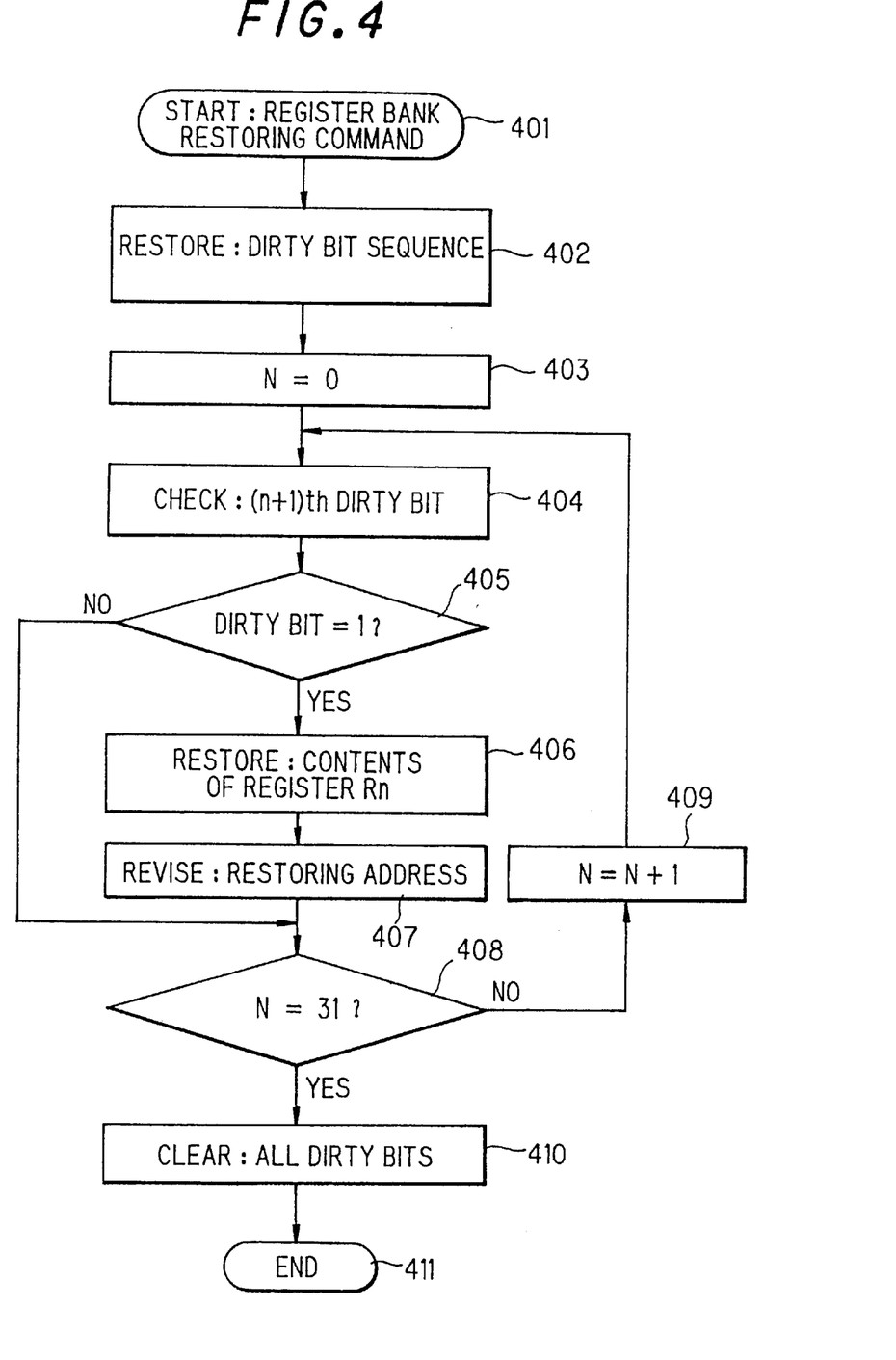
FIG. 4 is a flowchart illustrating restoring algorithm of the embodiment.
Figure 5:
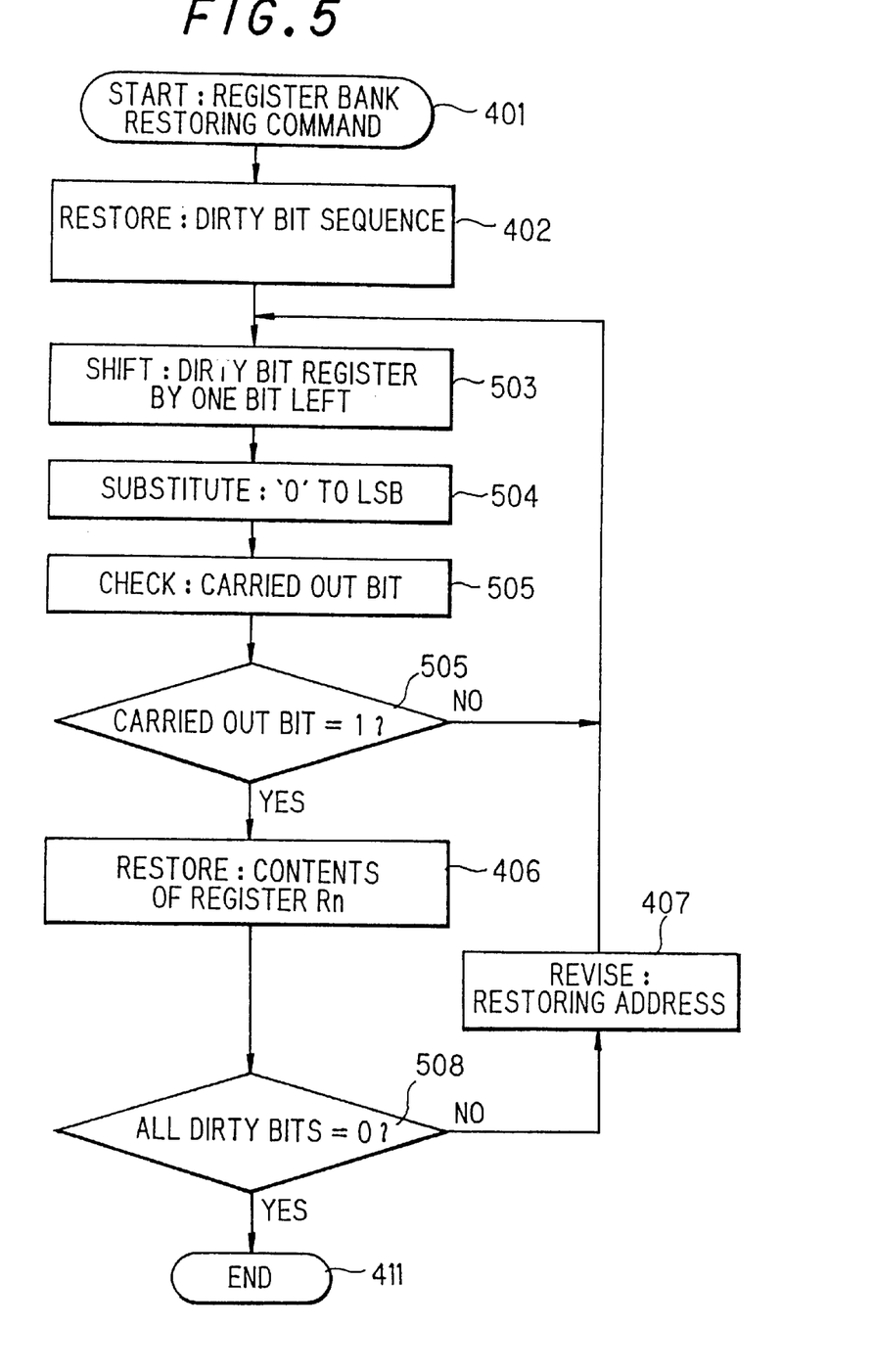
FIG. 5 is a flowchart illustrating restoring algorithm of another embodiment of the invention.

Now, another embodiment of the present invention is described referring to the flowchart of FIG. 5, wherein the same numerals indicate the same or a corresponding step of the flowchart of FIG. 4 and duplicated descriptions are omitted.

In the algorithm beforehand described referring to FIG. 4, all the dirty bits in the restored dirty bit register 103 of FIG. 1 are checked at step 405.

In the embodiment of FIG. 5, the dirty bits in the restored dirty bit register 103 are left-shifted (at step 503) bit by bit each time LSB (Least Significant Bit) substituted with value '0', and each carried out bit is checked (at step 505). The deployment (at step 406) of the contents of the context 200 and the revision (at step 407) of the restoring address is performed only when a bit of value '1' is carried out (at step 505). Further, after each deployment (at step 406), logical sum of contents of the dirty bit register 103 is verified (at step 508) whether it is '0' or not for finding accomplishment (at step 411) of the register bank restoring command.

Therefore, in the embodiment of FIG. 5, extra checking processes after the last deployment of contents saved in the context 200 into the last modified register can be further omitted compared to the embodiment of FIG. 4, enabling higher speed saving and restoring of the register bank.

As heretofore described, only contents of modified registers are saved and restored for omitting extra external memory accesses through the external bus by way of the present invention, minimizing overhead of processing time used by the OS and consequently, minimizing performance loss inevitable because of context modification.

What is claimed is:

1. A system for saving contents of a plurality of registers into a first area of a memory and for restoring contents of the plurality of registers with contents previously saved in a second area of the memory; the system comprising:

a first bit sequence, wherein the value of each individual bit of the first bit sequence is set to indicate a modification status of a corresponding register; and control means for saving contents of the first bit sequence, for saving contents of each of the registers indicated to have been modified at a predetermined address of the first area of the memory and for revising the predetermined address, for restoring contents previously saved at a restoring address of the second area of the memory into each of the registers to be restored, for revising the restoring address, and for referring to a second bit sequence saved in the second area of the memory, wherein each bit of the second bit sequence is set to indicate a modification status of corresponding registers at the time when the contents to be restored are saved and each of the registers to be restored are indicated to have been modified.

2. The system according to claim 1, wherein the second bit sequence is restored before the contents to be restored are restored and wherein each bit of the second bit sequence restored is reset after the contents to be restored are restored.

3. The system according to claim 1, wherein the second bit sequence is left shifted bit by bit each time LSB thereof substituted is set to '0' and carrying out a bit to be referred to.

4. The system according to claim 3, wherein restoring of the contents to be restored is decided to be accomplished when logical sum of the second bit sequence is found to be set to '0'.

\* \* \* \* \*